United States Patent
Ko et al.

(10) Patent No.: US 7,292,298 B2
(45) Date of Patent: Nov. 6, 2007

(54) TRANSFLECTIVE LIQUID CRYSTAL DISPLAY DEVICE WITH BALANCED COLOR PURITY

(75) Inventors: Fu-Jen Ko, Hsinchu (TW); Ching-Yu Tsai, Kaohsiung (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 11/723,496

(22) Filed: Mar. 20, 2007

(65) Prior Publication Data

US 2007/0188684 A1  Aug. 16, 2007

Related U.S. Application Data

(62) Division of application No. 10/663,678, filed on Sep. 17, 2003, now Pat. No. 7,206,046.

(30) Foreign Application Priority Data

Sep. 19, 2002 (TW) ............................... 91121424 A

(51) Int. Cl.
*G02F 1/1335* (2006.01)
(52) U.S. Cl. ...................... 349/114; 349/106
(58) Field of Classification Search ................ 349/106, 349/113–114
See application file for complete search history.

(56) References Cited

U.S. PATENT DOCUMENTS

| | | | |
|---|---|---|---|
| 6,621,543 B2 * | 9/2003 | Moon | 349/115 |
| 6,690,438 B2 | 2/2004 | Sekiguchi et al. | |
| 6,757,038 B2 | 6/2004 | Itoh et al. | |
| 6,831,718 B2 | 12/2004 | Wei et al. | |
| 6,885,418 B2 * | 4/2005 | Matsushita et al. | 349/113 |
| 6,992,737 B2 | 1/2006 | Kaneko et al. | |
| 7,009,669 B2 | 3/2006 | Ozawa et al. | |
| 7,015,995 B2 * | 3/2006 | Ikeno et al. | 349/113 |
| 7,038,749 B2 | 5/2006 | Liu et al. | |
| 2002/0003596 A1 | 1/2002 | Kim | |
| 2005/0195346 A1 * | 9/2005 | Maeda et al. | 349/114 |

* cited by examiner

*Primary Examiner*—Toan Ton
(74) *Attorney, Agent, or Firm*—Rabin & Berdo, P.C.

(57) ABSTRACT

A transflective LCD device. The device includes a first color filter on a first substrate, and a reflective electrode on the first color filter. The reflective electrode has an opaque portion and a transparent portion. A second color filter is formed on an inner side of a second substrate opposite the first substrate. A common electrode is on the second color filter, and a liquid crystal layer is between the first and the second substrates. Another transflective LCD device is provided, including a first color filter on a first substrate, a reflective layer on part of the first color filter, a second color filter on the reflective layer and the first color filter, a transparent electrode on the second color filter, and a common electrode on an inner side of a second substrate opposite the first substrate.

11 Claims, 5 Drawing Sheets

TRANSFLECTIVE LIQUID CRYSTAL DISPLAY DEVICE WITH BALANCED COLOR PURITY

CROSS-REFERENCE TO RELATED APPLICATION

This application is a division of application Ser. No. 10/663,678, filed Sep. 17, 2003 now U.S. Pat. No. 7,206,046, the entire disclosure of which is incorporated herein by reference.

BACKGROUND OF THE INVENTION

1. Field of the Invention

The present invention relates to a transflective liquid crystal display device, and more particularly, to a transflective liquid crystal display device with balanced color purity in both transmissive and reflective modes.

2. Description of the Related Art

Liquid crystal display (LCD) devices are widely used for display devices, such as a portable televisions and notebook computers. Liquid crystal display devices are classified into two types. One is a transmission type liquid crystal display device using a backlight as a light source, and another is the reflective type liquid crystal display device using an external light source, such as sunlight or indoor lamp. It is difficult to decrease the weight, volume, and power consumption of the transmission type LCD due to the power requirements of the backlight component. The reflective type LCD has the advantage of not requiring a backlight component, but cannot operate without an external light source.

In order to overcome the drawbacks of these two types of LCDs, a transflective LCD device which can operate as both a reflective and transmission type LCD is disclosed in U.S. Pub. No. 2002/0003596. The transflective LCD device has a reflective electrode in a pixel region, wherein the reflective electrode has a transmissive portion. Thus, the transflective LCD device has lower power consumption than the conventional transmission type LCD device because a backlight component is not used when there is a bright external light. Further, in comparison with the reflective type LCD device, the transflective LCD device has the advantage of operating as a transmission type LCD device using backlight when no external light is available.

FIG. 1 is a sectional view of a conventional transflective LCD device, which helps to illustrate the operation of such devices. As shown in FIG. 1, the conventional transflective LCD device includes a lower substrate 100, an upper substrate 160 and an interposed liquid crystal layer 130. The upper substrate 160 has a common electrode 140 and a color filter 150 formed thereon. The lower substrate 100 has an insulating layer 110 and a reflective electrode 120 formed thereon, wherein the reflective electrode 120 has an opaque portion 122 and a transparent portion 124. The opaque portion 122 of the reflective electrode 120 can be an aluminum layer and the transparent portion 124 of the reflective electrode 120 can be an ITO (indium tin oxide) layer. The opaque portion 122 reflects the ambient light 170, while the transparent portion 124 transmits light 180 from a backlight device (not shown). Thus, the transflective LCD device is operable in both a reflective mode and a transmissive mode.

The conventional transflective LCD device, however, has a problem of different color reproduction levels (color purity) in reflective and transmissive modes, due to, referring to FIG. 1, the backlight 180 penetrating the transparent portion 124 through the color filter 150 once and the ambient light 170 reflected from the opaque portion 122 passes through the color filter 150 twice. This degrades the display quality of transflective LCDs greatly.

SUMMARY OF THE INVENTION

The object of the present invention is to provide a transflective liquid crystal display device with balanced color purity in both transmissive and reflective modes.

In order to achieve these objects, the present invention provides a transflective liquid crystal display device. A first substrate and a second substrate opposite thereto are provided. A first color filter is formed on the first substrate. A reflective electrode is formed on the first color filter, wherein the reflective electrode has at least one opaque portion and at least one transparent portion. A second color filter is formed on an inner side of the second substrate. A common electrode on the second color filter. A liquid crystal layer is interposed between the first substrate and the second substrate.

The present invention also provides another transflective liquid crystal display device. A first substrate and a second substrate opposite thereto are provided. A first color filter is formed on the first substrate. A reflective layer is formed on part of the first color filter. A second color filter is formed on the reflective layer and the first color filter. A transparent electrode is formed on the second color filter. A common electrode is formed on an inner side of the second substrate. A liquid crystal layer is interposed between the first substrate and the second substrate.

The present invention improves on the prior art in that the first color filter is located below the reflective electrode/layer and the second color filter is located above the reflective electrode/layer. Thus, the backlight penetrating the transparent portion passes through the first color filter once and the second color filter once. The ambient light reflected from the opaque portion passes through the second color filter twice. That is, the number of passages of the backlight and the ambient light through the color filters are the same, twice, thereby normalizing color reproduction (color purity) between reflective and transmissive modes of the transflective LCD.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Reference will now be made in detail to the preferred embodiments of the present invention, which are illustrated in the accompanying drawings.

FIRST EMBODIMENT

Figure 1:
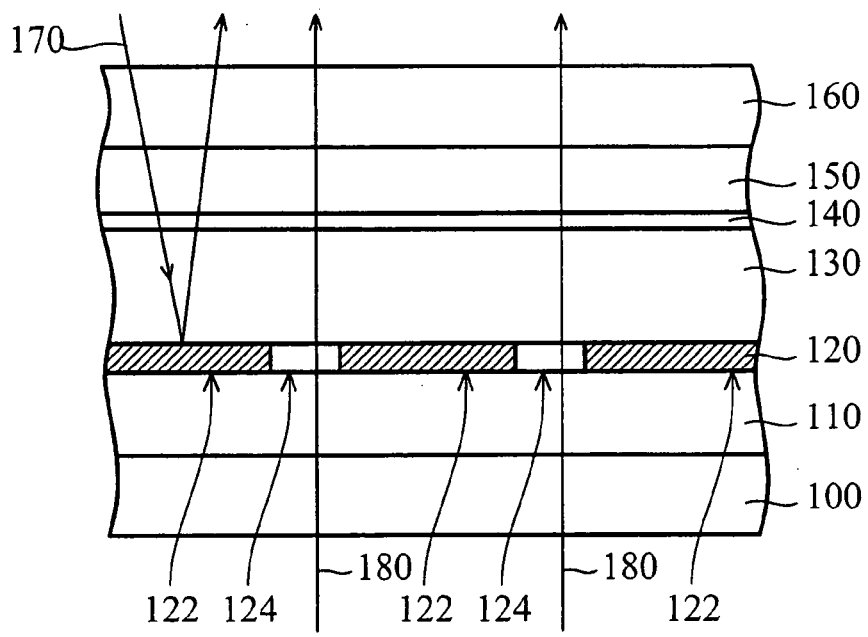
FIG. 1 is a sectional view according to a conventional transflective LCD device.
Figure 2:
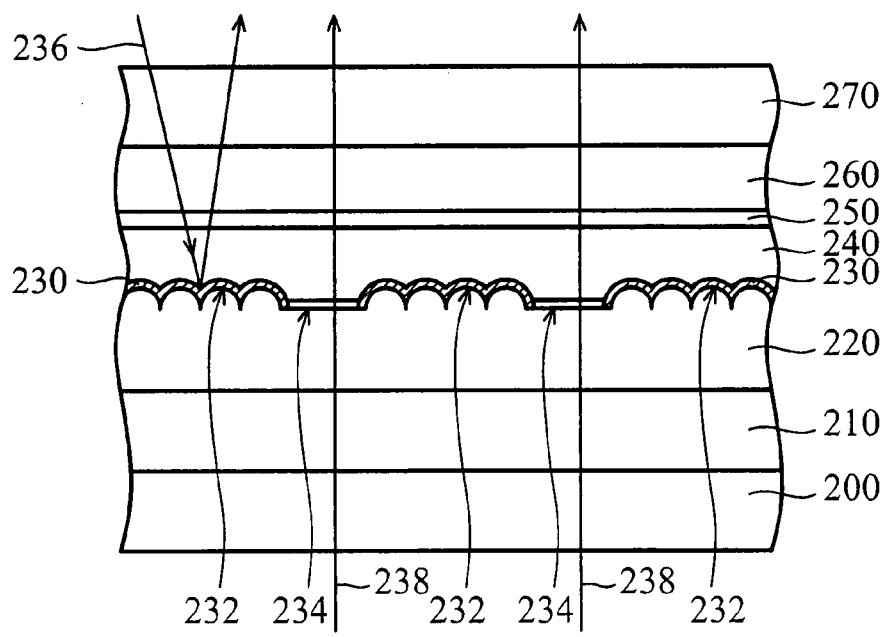
FIG. 2 is a sectional view according to a first embodiment of the present invention.

FIG. 2 is a sectional view according to a first embodiment of the present invention.

In FIG. 2, a first substrate 200 and a second substrate 270 opposite thereto are provided. The first substrate 200 can be a glass substrate comprising a thin film transistor (TFT) array and the second substrate 270 can also be a glass substrate. Then, a first color filter 210 is formed on the first substrate 200. The first color filter 210 may have three color regions, such as red (R), green (G), and blue (B).

In FIG. 2, an insulating layer 220 is formed on the first color filter 210. The insulating layer 220 may be a transparent photosensitive resist layer. Then, a reflective electrode 230 is formed on the insulating layer 220, wherein the reflective electrode 230 has at least one opaque portion 232 and at least one transparent portion 234. The opaque portion 232 of the reflective electrode 230 reflects the ambient light 236 in the reflective mode. The backlight 238 passes through the transparent portion 234 in the transmissive mode. The opaque portion 232 of the reflective electrode 230 can be an aluminum layer having an uneven surface. The transparent portion 234 of the reflective electrode 230 can be an ITO (indium tin oxide) or IZO (indium zinc oxide) layer.

In FIG. 2, a second color filter 260 is formed on an inner side of the second substrate 270. The second color filter 260 may have three color regions, such as red (R), green (G), and blue (B). A common electrode 250, such as an ITO layer, is then formed on the second color filter 260. Next, liquid crystal material fills a space between the first substrate 200 and the second substrate 270 to form a liquid crystal layer 240. Thus, a transflective LCD is obtained.

As shown in FIG. 2, the backlight 238 penetrating the transparent portion 234 passes through the first color filter 210 once and the second color filter 260 once. The ambient light 236 reflected from the opaque portion 232 passes through the second color filter 260 twice. Thus, the number of passages of the backlight 238 and the ambient light 236 through the color filter are the same, twice, thereby normalizing color reproduction (color purity) between reflective and transmissive modes of the transflective LCD of the first embodiment.

SECOND EMBODIMENT

Figure 3:
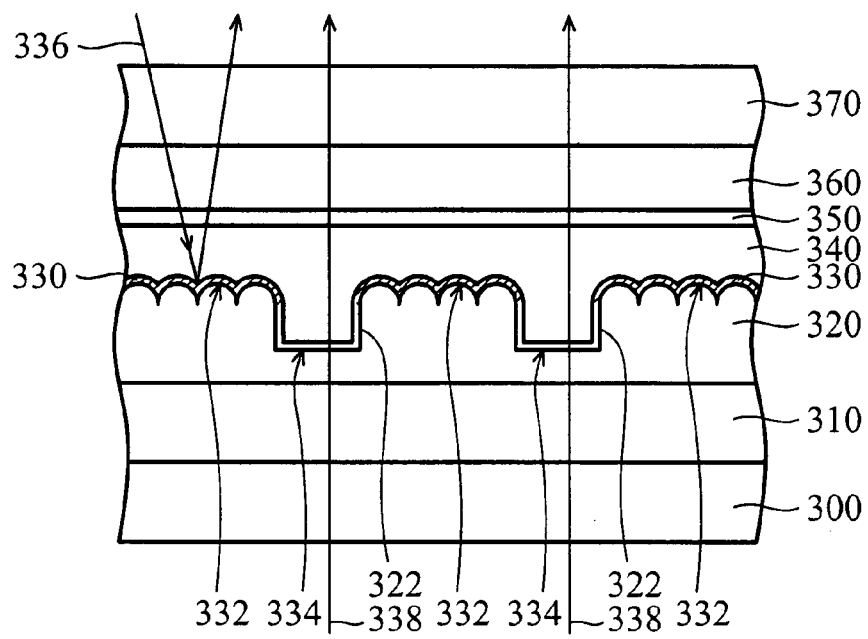
FIG. 3 is a sectional view according to a second embodiment of the present invention.

FIG. 3 is a sectional view according to a second embodiment of the present invention.

In FIG. 3, a first substrate 300 and a second substrate 370 opposite thereto are provided. The first substrate 300 can be a glass substrate comprising a thin film transistor (TFT) array and the second substrate 370 can be a glass substrate. Then, a first color filter 310 is formed on the first substrate 300. The first color filter 310 may have three color regions, such as red (R), green (G), and blue (B).

In FIG. 3, an insulating layer 320 is formed on the first color filter 310. The insulating layer 320 may be a transparent photosensitive resist layer. Then, part of the insulating layer 320 is removed to form at least one opening 322 in the insulating layer 320. A reflective electrode 330 is then formed on the insulating layer 320 and on the sidewall and bottom of the opening 322. The reflective electrode 330 has at least one opaque portion 332 and at least one transparent portion 334, wherein the transparent portion 334 is located in the opening 322. The opaque portion 332 of the reflective electrode 330 reflects the ambient light 336 in the reflective mode. The backlight 338 passes through the transparent portion 334 in the transmissive mode. The opaque portion 332 of the reflective electrode 330 can be an aluminum layer having an uneven surface. The transparent portion 334 of the reflective electrode 330 can be an ITO or IZO layer.

In FIG. 3, a second color filter 360 is formed on an inner side of the second substrate 370. The second color filter 360 may have three color regions, such as red (R), green (G), and blue (B). Then, a common electrode 350, such as an ITO layer, is formed on the second color filter 360. Next, liquid crystal material fills a space between the first substrate 300 and the second substrate 370 to form a liquid crystal layer 340. A transflective LCD is thus obtained.

As shown in FIG. 3, the backlight 338 penetrating the transparent portion 334 passes through the first color filter 310 once and the second color filter 360 once. The ambient light 336 reflected from the opaque portion 332 passes through the second color filter 360 twice. Thus, the number of passages of the backlight 338 and the ambient light 336 through the color filter are the same, twice, thereby normalizing color reproduction (color purity) between reflective and transmissive modes of the transflective LCD of the second embodiment.

THIRD EMBODIMENT

Figure 4:
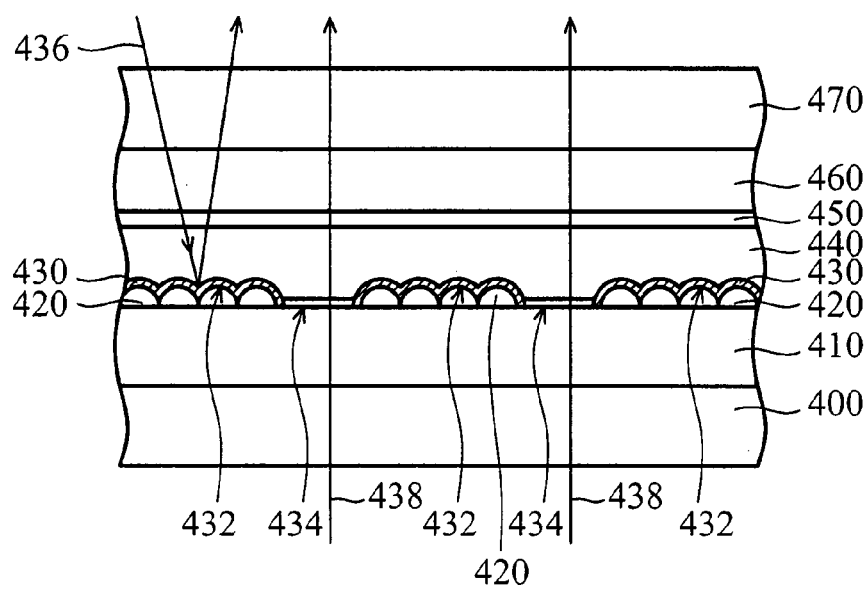
FIG. 4 is a sectional view according to a third embodiment of the present invention.

FIG. 4 is a sectional view according to a third embodiment of the present invention.

In FIG. 4, a first substrate 400 and a second substrate 470 opposite the first substrate 400 are provided. The first substrate 400 can be a glass substrate comprising a thin film transistor (TFT) array and the second substrate 470 can be a glass substrate. Then, a first color filter 410 is formed on the first substrate 400. The first color filter 410 may have three color regions, such as red (R), green (G), and blue (B).

In FIG. 4, an insulating layer 420 with bumps is formed on part of the first color filter 410. The insulating layer 420 can be opaque or transparent. Then, a reflective electrode 430 is formed on the first color filter 410 and the insulating layer 420, wherein the reflective electrode 430 has at least one opaque portion 432 and at least one transparent portion 434. The opaque portion 432 of the reflective electrode 430 is located on the insulating layer 420 and reflects the ambient light 436 in the reflective mode. The backlight 438 passes through the transparent portion 434, located on the exposed first color filter 410, in the transmissive mode. The opaque portion 432 of the reflective electrode 430 can be an aluminum layer having an uneven surface. The transparent portion 434 of the reflective electrode 430 can be an ITO or IZO layer.

In FIG. 4, a second color filter 460 is formed on an inner side of the second substrate 470. The second color filter 460 may have three color regions, such as red (R), green (G), and blue (B). Then, a common electrode 450, such as an ITO layer, is formed on the second color filter 460. Next, liquid crystal material fills a space between the first substrate 400 and the second substrate 470 to form a liquid crystal layer 440. A transflective LCD is thus obtained.

As shown in FIG. 4, the backlight 438 penetrating the transparent portion 434 passes through the first color filter 410 once and the second color filter 460 once. The ambient light 436 reflected from the opaque portion 432 passes through the second color filter 460 twice. Thus, the number of passages of the backlight 438 and the ambient light 436 through the color filter are the same, twice, thereby normalizing color reproduction (color purity) between reflective and transmissive modes of the transflective LCD of the third embodiment.

FOURTH EMBODIMENT

Figure 5:
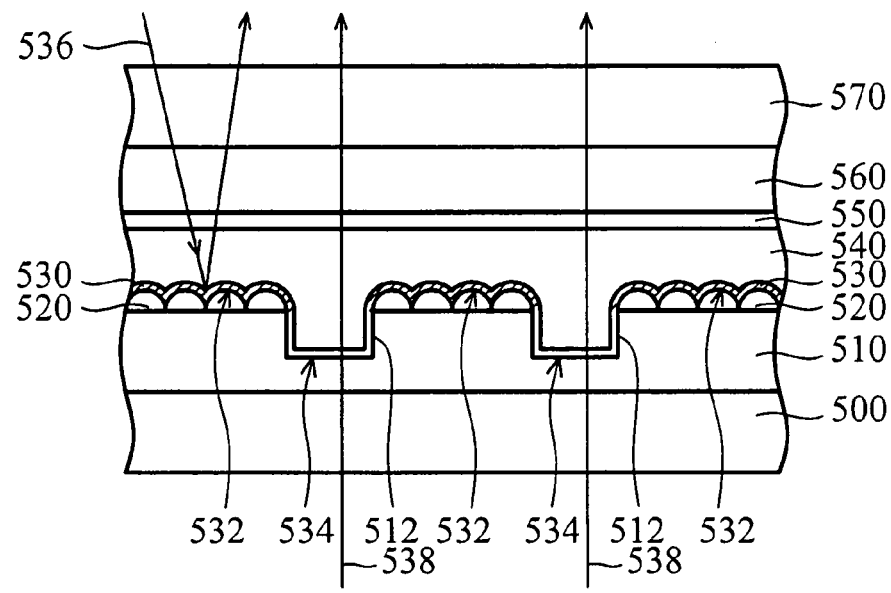
FIG. 5 is a sectional view according to a fourth embodiment of the present invention.

FIG. 5 is a sectional view according to a fourth embodiment of the present invention.

In FIG. 5, a first substrate 500 and a second substrate 570 opposite the first substrate 500 are provided. The first substrate 500 can be a glass substrate comprising a thin film transistor (TFT) array and the second substrate 570 can be a glass substrate. Then, a first color filter 510 is formed on the first substrate 500. The first color filter 510 may have three color regions, such as red (R), green (G), and blue (B). An insulating layer 520 with bumps is then formed on part of the first color filter 510. Using the insulating layer 520 as a mask, part of the first color filter 510 is then removed to form at least one opening 512 with a determined depth in the first color filter 510. That is, the bottom of the opening 512 does not expose the substrate 500.

In FIG. 5, a reflective electrode 530 is formed on the insulating layer 520 and on the sidewall and the bottom of the opening 512. The reflective electrode 530 has at least one opaque portion 532 and at least one transparent portion 534, wherein the transparent portion 534 is located in the opening 512. The opaque portion 532 of the reflective electrode 530 reflects the ambient light 536 in the reflective mode. The backlight 538 passes through the transparent portion 534 in the transmissive mode. The opaque portion 532 of the reflective electrode 530 can be an aluminum layer having an uneven surface. The transparent portion 534 of the reflective electrode 530 can be an ITO or IZO layer.

In FIG. 5, a second color filter 560 is formed on an inner side of the second substrate 570. The second color filter 560 may have three color regions, such as red (R), green (G), and blue (B). Then, a common electrode 550, such as an ITO layer, is formed on the second color filter 560. Next, liquid crystal material fills a space between the first substrate 500 and the second substrate 570 to form a liquid crystal layer 540. Thus, a transflective LCD is obtained.

As shown in FIG. 5, the backlight 538 penetrating the transparent portion 534 passes through the first color filter 510 once and the second color filter 560 once. The ambient light 536 reflected from the opaque portion 532 passes through the second color filter 560 twice. Thus, the number of passages of the backlight 538 and the ambient light 536 through the color filter are the same, twice, thereby normalizing color reproduction (color purity) between reflective and transmissive modes of the transflective LCD of the fourth embodiment.

FIFTH EMBODIMENT

Figure 6:
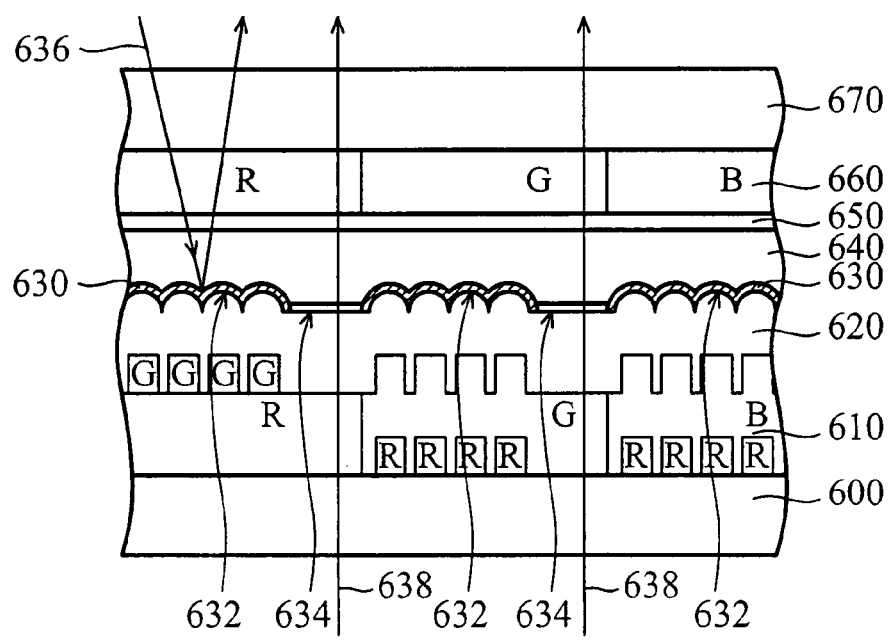
FIG. 6 is a sectional view according to a fifth embodiment of the present invention.

FIG. 6 is a sectional view according to a fifth embodiment of the present invention.

In FIG. 6, a first substrate 600 and a second substrate 670 opposite the first substrate 600 are provided. The first substrate 600 can be a TFT array glass substrate and the second substrate 670 can be a glass substrate. Then, a first color filter 610 having uneven surface is formed on the first substrate 600. The first color filter 610 may have three color regions, such as red (R), green (G), and blue (B). As a demonstrative example, referring to FIG. 6, a red (R) pattern is formed on part of the first substrate 600 by a patterning process. Then, a green (G) pattern is formed on part of the first substrate 600 and part of the red (R) pattern by a patterning process. Then, a blue (B) pattern is formed on part of the first substrate 600 and part of the red (R) pattern by a patterning process. Thus, a partial surface of the first color filter 610 with bumps is obtained.

In FIG. 6, an insulating layer 620 is formed on the first color filter 610. The insulating layer 620 may be a transparent photosensitive resist layer. Part of the insulating layer 620 is uneven due to the first color filter 610 having bumps. Then, a reflective electrode 630 is formed on the insulating layer 620, wherein the reflective electrode 630 has at least one opaque portion 632 and at least one transparent portion 634. The opaque portion 632 of the reflective electrode 630 is located on the bumps and reflects the ambient light 636 in the reflective mode. The backlight 638 passes through the transparent portion 634 in the transmissive mode. The opaque portion 632 of the reflective electrode 630 can be an aluminum layer having an uneven surface. The transparent portion 634 of the reflective electrode 630 can be an ITO or IZO layer.

In FIG. 6, a second color filter 660 is formed on an inner side of the second substrate 670. The second color filter 660 may have three color regions, such as red (R), green (G), and blue (B). Then, a common electrode 650, such as an ITO layer, is formed on the second color filter 660. Next, liquid crystal material fills a space between the first substrate 600 and the second substrate 670 to form a liquid crystal layer 640. Thus, a transflective LCD is obtained.

As shown in FIG. 6, the backlight 638 penetrating the transparent portion 634 passes through the first color filter 610 once and the second color filter 660 once. The ambient light 636 reflected from the opaque portion 632 passes through the second color filter 660 twice. Thus, the number of passages of the backlight 638 and the ambient light 636 through the color filter are the same, twice, thereby normalizing color reproduction (color purity) between reflective and transmissive modes of the transflective LCD of the fifth embodiment.

SIXTH EMBODIMENT

Figure 7:
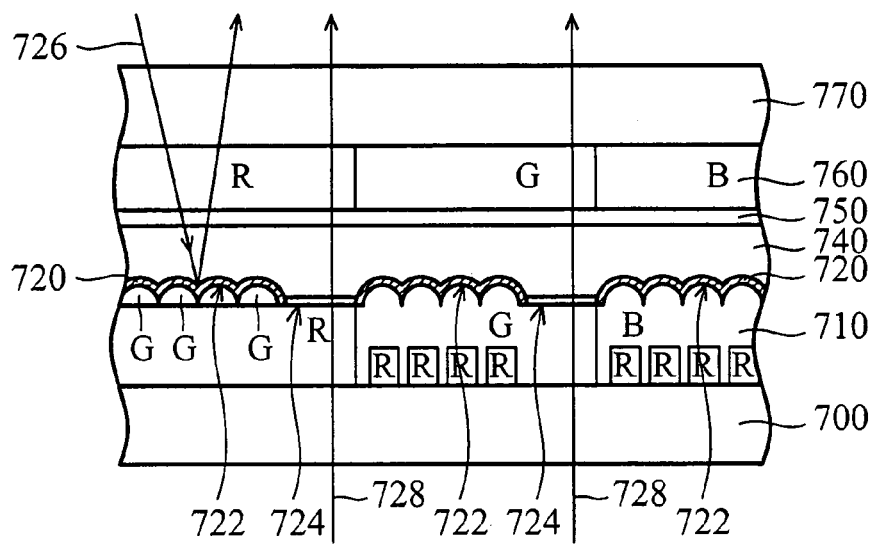
FIG. 7 is a sectional view according to a sixth embodiment of the present invention.

FIG. 7 is a sectional view according to a sixth embodiment of the present invention.

In FIG. 7, a first substrate 700 and a second substrate 770 opposite thereto are provided. The first substrate 700 can be a thin film transistor (TFT) array substrate and the second substrate 770 can be a glass substrate. Then, a first color filter 710 having uneven surface is formed on the first substrate 700. The first color filter 710 may have three color regions, such as red (R), green (G), and blue (B). As a demonstrative example, referring to FIG. 7, a red (R) pattern is formed on part of the first substrate 700 by a patterning process. Then, a green (G) pattern is formed on part of the first substrate 700 and part of the red (R) pattern by a patterning process. Then, a blue (B) pattern is formed on part of the first substrate 700 and part of the red (R) pattern by a patterning process. Moreover, a thermal flow process is performed, whereby the first color filter 710 whose partial surfaces have bumps is formed.

In FIG. 7, a reflective electrode 720 is formed on the first color filter 710. The reflective electrode 720 has at least one opaque portion 722 and at least one transparent portion 724. The opaque portion 722 of the reflective electrode 720 is located on the bumps and reflects the ambient light 726 in the reflective mode. The backlight 728 passes through the transparent portion 724 in the transmissive mode. The opaque portion 722 of the reflective electrode 720 can be an aluminum layer having an uneven surface. The transparent portion 724 of the reflective electrode 720 can be an ITO or IZO layer.

In FIG. 7, a second color filter 760 is formed on an inner side of the second substrate 770. The second color filter 760 may have three color regions, such as red (R), green (G), and blue (B). Then, a common electrode 750, such as an ITO layer, is formed on the second color filter 760. Next, liquid crystal material fills a space between the first substrate 700 and the second substrate 770 to form a liquid crystal layer 740. A transflective LCD is thus obtained.

As shown in FIG. 7, the backlight 728 penetrating the transparent portion 724 passes through the first color filter 710 once and the second color filter 760 once. The ambient light 726 reflected from the opaque portion 722 passes through the second color filter 760 twice. Thus, the number of passages of the backlight 728 and the ambient light 726 through the color filter are the same, twice, thereby normalizing color reproduction (color purity) between reflective and transmissive modes of the transflective LCD of the sixth embodiment.

SEVENTH EMBODIMENT

Figure 8:
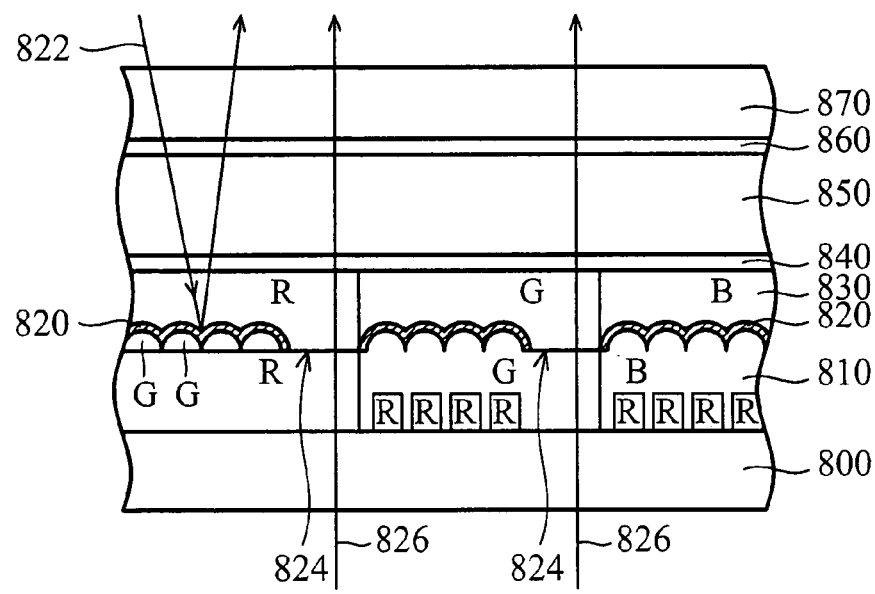
FIG. 8 is a sectional view according to a seventh embodiment of the present invention.

FIG. 8 is a sectional view according to a seventh embodiment of the present invention.

In FIG. 8, a first substrate 800 and a second substrate 870 opposite thereto are provided. The first substrate 800 can be a thin film transistor (TFT) array substrate and the second substrate 870 can be a glass substrate. Then, a first color filter 810 having uneven surface is formed on the first substrate 800. The first color filter 810 may have three color regions, such as red (R), green (G), and blue (B). As a demonstrative example, referring to FIG. 8, a red (R) pattern is formed on part of the first substrate 800 by a patterning process. Then, a green (G) pattern is formed on part of the first substrate 800 and part of the red (R) pattern by a patterning process. Then, a blue (B) pattern is formed on part of the first substrate 800 and part of the red (R) pattern by a patterning process. A thermal flow process is further performed, whereby the first color filter 810 whose partial surfaces have bumps is obtained.

In FIG. 8, a conformal reflective layer 820 is formed on the bump portion of the first color filter 810. Here, the first color filter 810 having no reflective layer 820 thereon is referred to as a portion 824. The reflective layer 820 may be an aluminum layer having an uneven surface. The reflective layer 820 is located on the bumps and reflects the ambient light 822 in the reflective mode. The backlight 826 passes through the portion 824 in the transmissive mode.

In FIG. 8, a second color filter 830 is formed on the reflective layer 820 and the first color filter 810. The second color filter 830 may have three color regions, such as red (R), green (G), and blue (B). Then, a transparent electrode 840 (also called a pixel electrode) is formed on the second color filter 830. The transparent electrode 840 can be an ITO or IZO layer.

In FIG. 8, a common electrode 860, such as an ITO layer, is formed on an inner side of the second substrate 870. Then, liquid crystal material fills a space between the first substrate 800 and the second substrate 870 to form a liquid crystal layer 850. Thus, a transflective LCD is obtained.

As shown in FIG. 8, the backlight 826 penetrating the portion 824 passes through the first color filter 810 once and the second color filter 830 once. The ambient light 822 reflected from the reflective layer 820 passes through the second color filter 830 twice. Thus, the number of passages of the backlight 826 and the ambient light 822 through the color filter are the same, twice, thereby normalizing color reproduction (color purity) between reflective and transmissive modes of the transflective LCD of the seventh embodiment.

EIGHTH EMBODIMENT

Figure 9:
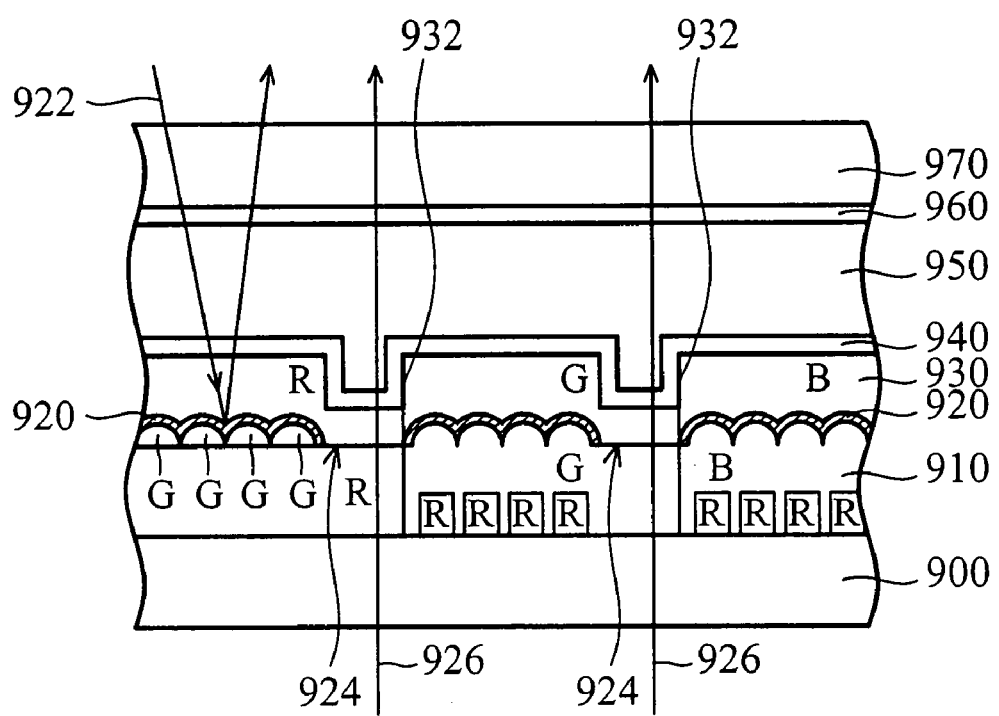
FIG. 9 is a sectional view according to an eighth embodiment of the present invention.

FIG. 9 is a sectional view according to an eighth embodiment of the present invention.

In FIG. 9, a first substrate 900 and a second substrate 970 opposite thereto are provided. The first substrate 900 can be a thin film transistor (TFT) array substrate and the second substrate 970 can be a glass substrate. Then, a first color filter 910 having uneven surface is formed on the first substrate 900. The first color filter 910 may have three color regions, such as red (R), green (G), and blue (B). As a demonstrative example, referring to FIG. 9, a red (R) pattern is formed on part of the first substrate 900 by a patterning process. Then, a green (G) pattern is formed on part of the first substrate 900 and part of the red (R) pattern by a patterning process. Then, a blue (B) pattern is formed on part of the first substrate 900 and part of the red (R) pattern by a patterning process. A thermal flow process is further performed, whereby the first color filter 910 whose partial surfaces have bumps is obtained.

In FIG. 9, a conformal reflective layer 920 is formed on the bump portion of the first color filter 910. Here, the first color filter 910 having no reflective layer 920 thereon is referred to as a portion 924. The reflective layer 920 may be an aluminum layer having an uneven surface. The reflective layer 920 is located on the bumps and reflects the ambient light 922 in the reflective mode. The backlight 926 passes through the portion 924 in the transmissive mode.

In FIG. 9, a second color filter 930 is formed on the reflective layer 920 and the first color filter 910. The second color filter 930 may have three color regions, such as red (R), green (G), and blue (B). Then, part of the second color filter 930 is removed to form at least one opening 932 in the second color filter 930. It should be noted that the opening 932 does not expose the first color filter 910. A transparent electrode 940 (also called a pixel electrode) is then formed on the second color filter 930 and on the sidewall and the bottom of the opening 932. The transparent electrode 940 can be an ITO or IZO layer.

In FIG. 9, a common electrode 960, such as an ITO layer, is formed on an inner side of the second substrate 970. Next, liquid crystal material fills a space between the first substrate 900 and the second substrate 970 to form a liquid crystal layer 950. Thus, a transflective LCD is obtained.

As shown in FIG. 9, the backlight 926 penetrating the portion 924 passes through the first color filter 910 once and the second color filter 930 once. The ambient light 922 reflected from the reflective layer 920 passes through the second color filter 930 twice. Thus, the number of passages of the backlight 926 and the ambient light 922 through the color filter are the same, twice, thereby normalizing color reproduction (color purity) between reflective and transmissive modes of the transflective LCD of the eighth embodiment.

Thus, the present invention provides novel transflective liquid crystal display device structures with good display quality. The present invention is characterized in that the first color filter is located below the reflective electrode/layer and the second color filter is located above the reflective electrode/layer. The second color filter can be formed towards the first substrate or the second substrate. Thus, the number of passages of the backlight and the ambient light through the color filter are the same, twice, thereby normalizing color reproduction (color purity) between reflective and transmissive modes of the transflective LCDs.

Finally, while the invention has been described by way of example and in terms of the above, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A transflective liquid crystal display device, comprising:
    a first substrate and a second substrate opposite thereto, wherein the first substrate comprises a first color region, a second color region and a third color region;
    a first color filter on the first substrate, wherein the first color filter comprises:
        a first color pattern comprising a first color major portion in the first color region, and first color bumps in the second color region and the third color region;
        a second color pattern comprising a second color major portion covering the first color bumps in the second color region to have an uneven surface, and second color bumps on the major portion of the first color pattern in the first color region;
        a third color pattern covering the first color bumps in the third color region to have an uneven surface;
    a reflective electrode on the first color filter, wherein the reflective electrode has at least one opaque portion and at least one transparent portion;
    a second color filter on an inner side of the second substrate;
    a common electrode on the second color filter; and
    a liquid crystal layer between the first substrate and the second substrate.

2. The transflective LCD device according to claim 1, further comprising:
    an insulating layer formed between the first color filter and the reflective electrode.

3. The transflective LCD device according to claim 1, wherein the first substrate is a substrate comprising a thin film transistor (TFT) array.

4. The transflective LCD device according to claim 1, wherein the opaque portion of the reflective electrode is an aluminum layer having an uneven surface.

5. The transflective LCD device according to claim 1, wherein the transparent portion of the reflective electrode is an ITO (indium tin oxide) or IZO (indium zinc oxide) layer.

6. The transflectiye LCD device according to claim 1, wherein partial surfaces of the first color filter have bumps.

7. A method for forming a transflective liquid crystal display device, comprising:
    providing a first substrate, comprising a first color region, a second color region and a third color region;
    forming a first color pattern comprising a first color major portion in the first color region, and first color bumps in the second color region and the third color region;
    forming a second color pattern comprising a second color major portion covering the first color bumps in the second color region to have uneven surface, and second color bumps on the first color major portion of the first color pattern in the first color region;
    forming a third color pattern covering the first color pattern in the third color region to have uneven surface, wherein the first color pattern, the second color pattern and the third color pattern constitute a first color filter;
    forming a reflective electrode on the first color filter, wherein the reflective electrode has at least one opaque portion and at least one transparent portion;
    forming a second color filter overlying the reflective electrode;
    providing a second substrate; and
    forming a liquid crystal layer between the first substrate and the second substrate.

8. The method for forming a transflective liquid crystal display device according to claim 7, wherein the second color filter is directly formed on the reflective electrode.

9. The method for forming a transflective liquid crystal display device according to claim 7, wherein the second color filter is formed on a inner surface of the second substrate.

10. A transflective liquid crystal display device, comprising:
    a first substrate and a second substrate opposite thereto, wherein the first substrate comprises a first color region, a second color region and a third color region;
    a first color filter on the first substrate, wherein the first color filter comprises:
        a first color pattern comprising a first color major portion in the first color region, and first color bumps in the second color region and the third color region;
        a second color pattern comprising a second color major portion covering the first color bumps in the second color region to have an uneven surface, and second color bumps on the major portion of the first color pattern in the first color region;
        a third color pattern covering the first color bumps in the third color region to have an uneven surface;
    a reflective electrode disposed on the corresponding part of the first color bumps and the second color bumps;
    a second color filter on an inner side of the second substrate;
    a common electrode on the second color filter; and
    a liquid crystal layer between the first substrate and the second substrate.

11. The transflective LCD device according to claim 10, further comprising:
    an insulating layer formed between the first color filter and the reflective electrode.

* * * * *